H. L. PERRINE.
DOUBLE-ACTING AIR-BRAKE.
No. 169,575.
Patented Nov. 2, 1875.
3 Sheets—Sheet 1.
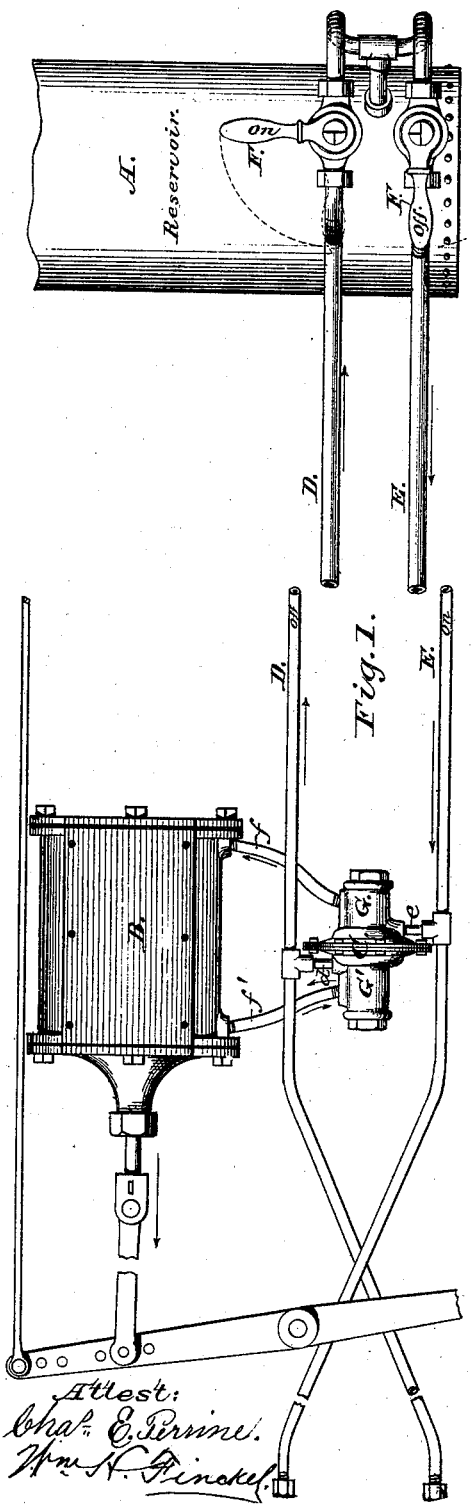
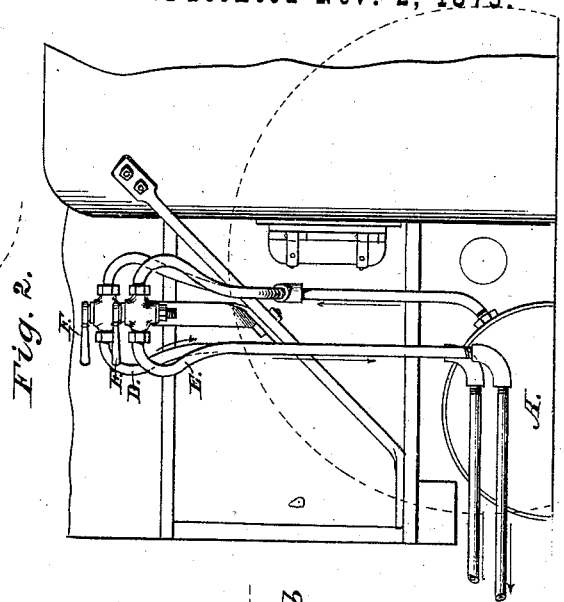
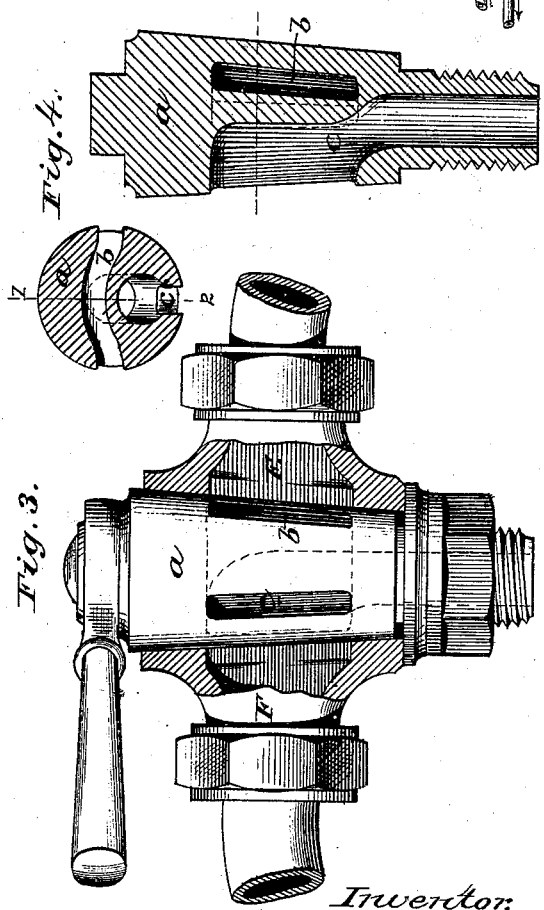

3 Sheets—Sheet 2.

H. L. PERRINE.
DOUBLE-ACTING AIR-BRAKE.

No. 169,575. Patented Nov. 2, 1875.

Attest:
Chas. E. Perrine.
Wm. H. Finckel.

Inventor.
H. Lansing Perrine.

H. L. PERRINE.
DOUBLE-ACTING AIR-BRAKE.
No. 169,575. Patented Nov. 2, 1875.
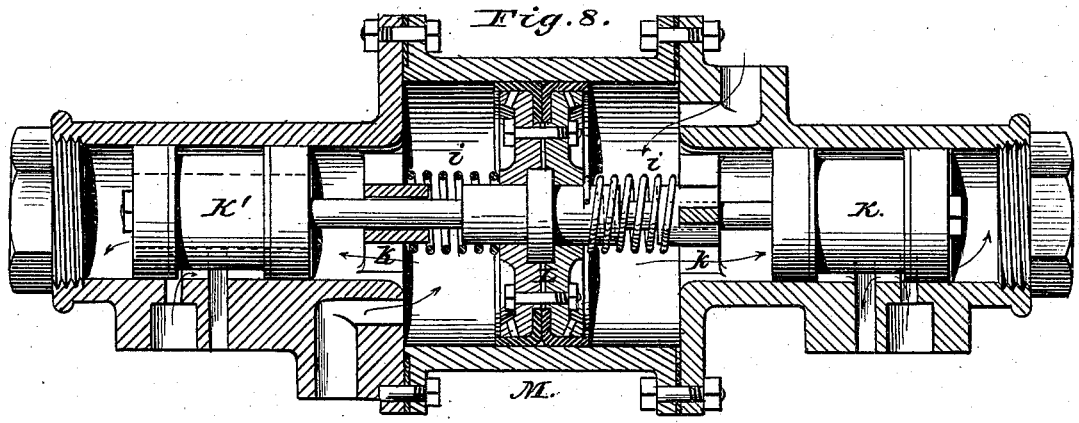
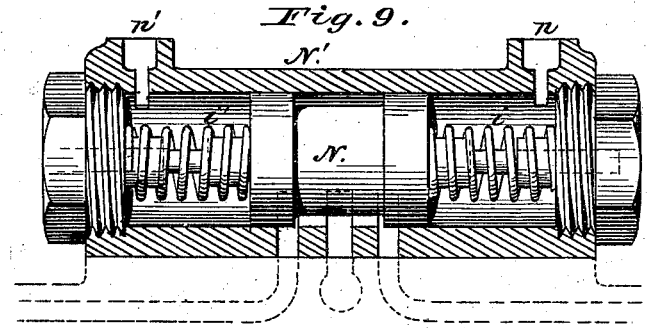
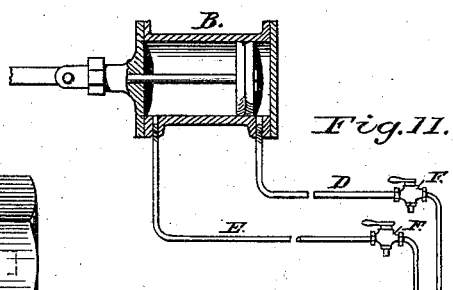
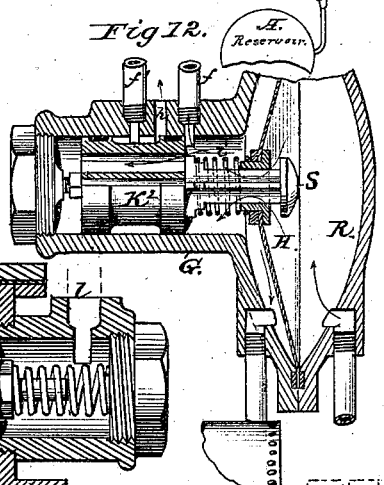
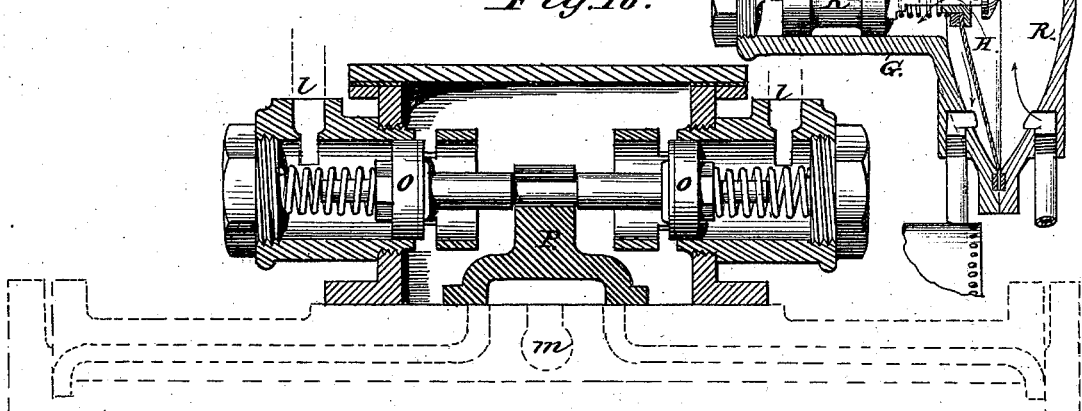
Attest:
Chas E. Perrine.
Wm H. Finckel.
Inventor:
H Lansing Perrine.

UNITED STATES PATENT OFFICE.

H. LANSING PERRINE, OF FREEHOLD, NEW JERSEY.

IMPROVEMENT IN DOUBLE-ACTING AIR-BRAKES.

Specification forming part of Letters Patent No. 169,575, dated November 2, 1875; application filed October 21, 1875.

*To all whom it may concern:*

Be it known that I, H. LANSING PERRINE, of Freehold, in the county of Monmouth and State of New Jersey, have invented certain new and useful Improvements in Double-Acting Air-Brakes, whereof the following is a full, clear, and exact description:

This invention relates to an air or steam actuated brake for cars, wherein two lines of pipes and a valve mechanism are employed in connection with the brake-cylinders for both setting and releasing the brake-shoes; and the invention consists in a brake mechanism composed of two independent lines of pipes connected with a single common compressed air-storing reservoir or a steam-chamber, located at the locomotive, each having a cock with a supply and exhaust opening, and extending thence to a valve connected with the brake-cylinder under each car, the combination being such that there is a pressure upon the valve at all times, which may be equalized or varied at will by the engineer at the engine, so as to hold the brakes and set and release them by direct application of the motive power employed; and, further, so that the brakes may be set and released with any degree of quickness.

In this invention I dispense with independent relief-valves, and also with the auxiliary reservoirs employed in my heretofore-described inventions.

Figure 5:
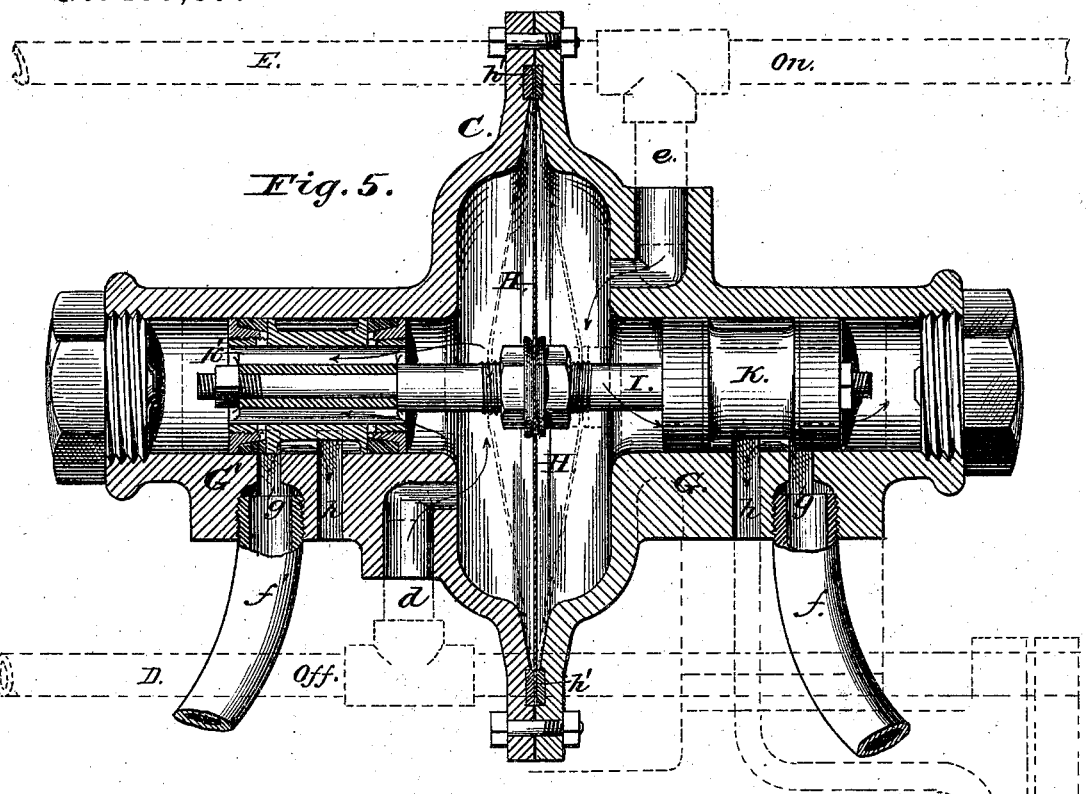
Figure 6:
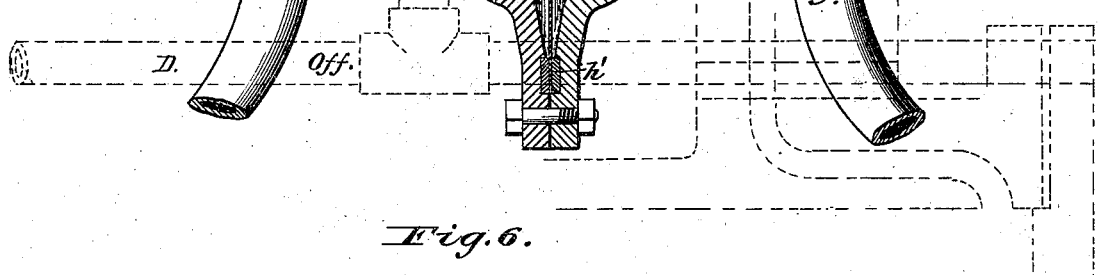
Figure 7:
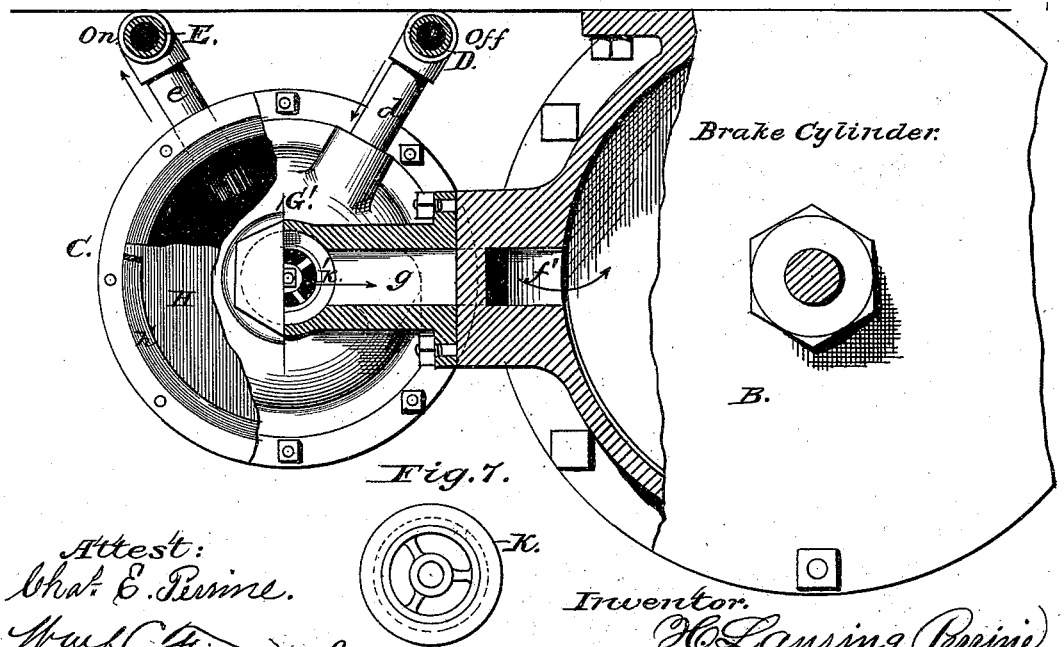

In the drawings hereto annexed, in the several figures of which similar letters of reference indicate corresponding parts, Figure 1 is a plan view of my brake mechanism; Fig. 2, a side elevation of the platform of the locomotive, showing the location of the cocks; Fig. 3, a partial section of the cock; Fig. 4, a vertical section of the plug of the cock; Fig. 5, a partial section of the valve; Fig. 6, an end and partly sectional view of valve and brake-cylinder, the valve, in this instance, being bolted directly to the brake-cylinder; Fig. 7, an end view of the hollow piston-valve; and Figs. 8, 9, 10, 11, and 12, sectional views of various modifications.

A represents the reservoir for compressed air; B, the brake-cylinder; C, the valve; D E, two independent lines of pipes, extending from the reservoir to the valve under each car of a train, and closed at the end of the same; and F F are cocks in pipes D E, within reach of the engineer. The valves C are connected with the brake-cylinders by branch pipes, as in Figs. 1 and 5, or are attached directly thereto by being bolted to suitable seats thereon, as shown in Fig. 6. The pipes, reservoir, and brake-cylinders are of the ordinary kind, with the exception of the modified construction of the cylinder just mentioned. The cocks F have an ordinary single-way barrel; but the plugs $a$ thereof are made with a curved or other transverse way, $b$, for allowing the air to flow through the pipes to the valves, and a longitudinal way, $c$, for the purpose of allowing the air to escape from the pipes into the external atmosphere. The valves C have a shell, composed of two cylinders, G $G^1$, the meeting ends of which are dish shape and bolted together, and the outer ends are closed by screw-caps or plugs, or other means. The valve-cylinders G $G^1$ are connected with the pipes D E by short pipes $d$ $e$, respectively, and with the brake-cylinder by pipes $f f'$. Between the meeting ends of the valves is secured, by packing-rings or otherwise, a movable or flexible diaphragm, H, which carries centrally a stem, I, projecting on each side into the cylinders G $G^1$. This stem has secured to it tubular or hollow pistons K $K^1$, one in each valve-cylinder, which are made to work as valves over posts $g$ $h$, the first-named posts being for induction and eduction alternately in the valve-cylinders, and the last serving as exhausts for opposite ends of the brake-cylinder.

The operation is as follows: Both of the cocks F are normally so turned as to keep a constant pressure through the pipes, and consequently an equalized pressure on the diaphragm. Now, if the brakes are to be set—that is, applied—the cock in pipe D is so turned as to bring the way $c$ in line with the pipe D, when the air in that pipe will exhaust from it and the valve-cylinder $G^1$. There is consequently an excess of pressure on the opposite side of the diaphragm, which will move said diaphragm, and thereby move the valves K $K^1$. This motion will carry the valve K past the port $g$, or open said port so that the air coming through the valve will pass out of said opening into the brake cylinder, and, acting against the piston therein, apply the brakes on each car simultaneously. At the same time the valve K¹ will open the ports $g\ h$ in its cylinder, and any air in the brake-cylinder previously used for forcing off will exhaust through these ports directly into the external atmosphere, so as not to impede the setting of the brakes. Of course, to release or force off the brakes, the cocks in the pipes have only to be turned in the opposite direction to that just described, so as to let the air in pipe D and valve-cylinder G¹, and exhaust it from pipe E and valve-cylinder G, whereby the air is admitted into the opposite end of the brake-cylinder to act against the piston.

It will be observed that the forcing on and off can be accomplished with any degree of force or speed desirable, the engineer having entire and perfect control of the whole train.

When the pressure in both pipes is equal the valves K K¹ will be in the positions relatively to ports $g\ h$, (shown in Fig. 5,) so that the air in the brake-cylinder may exhaust therefrom as soon as this position of inactivity is assumed. In this position of inactivity there is an equalized pressure on both sides of the diaphragm, and the instant this is destroyed the brakes are applied or "set." This maintenance of an equalization of pressure on the diaphragm, or in the two lines of pipes, obviates the necessity of supplying air from the main or an auxiliary reservoir every time the brakes are to be operated, and insures an immediate action of the brakes.

In Fig. 8 I have shown the valve-stem secured to a piston, L, instead of a diaphragm. Springs $i\ i$ are placed on each side of this piston, and bear against cross-bars $k$, to impart the necessary degree of elasticity to the piston. This construction involves the introduction of a cylinder, M, between the valve-cylinders.

In Fig. 9 is shown a solid plunger, N, with springs at each end on its stem. This plunger works in a shell, N', having inlets $n'$, and the mechanism is adapted to operate in connection with a three-port cylinder.

In Fig. 10 I have adapted the valve mechanism, in a modified form, to a three-port cylinder; but, instead of hollow valves, I employ solid spring-plungers O, fastened to a common stem, which also carries a common D-valve, that operates the ports. The inlets are at $l\ l$ in the plunger-chambers, and the exhaust or relief in the cylinder at $m$.

The pipes D E may be applied directly to opposite ends of the brake-cylinder, as indicated in Fig. 11. In this case the air from the brake-cylinder has to be carried back to the engine for exhaust; but, to avoid this, relief-valves may be fixed in each end of the cylinder.

In connection with a single line of pipe and an auxiliary reservoir I may employ a diaphragm, H', and chamber R, a valve-cylinder, G², and a hollow piston-valve, K², provided with a winged stem-valve, S, working centrally through the diaphragm, the operation of which will be readily understood from Fig. 12.

Having thus described my invention, what I claim as new, and desire to secure by Letters Patent, is—

1. The method of operating car-brakes, substantially as described, consisting in maintaining a pressure in two independent lines of pipes, which is equable or variable at will, for actuating a duplex-valve mechanism, whereby air is admitted to and exhausted from opposite ends of the brake-cylinder simultaneously, so as to set and force off the brakes.

2. In a brake mechanism operated by means of the pressure of air through two lines of pipe equalized and varied at will, the two cocks F F, constructed as described, and arranged one in each line of pipe, substantially as specified.

3. In a pneumatic-brake mechanism, substantially as described, the combination of a duplex-valve mechanism with two lines of pipes, and compound cocks therein, whereby an equalized or variable pressure is maintained in said valve, governable at will to set and release the brakes.

4. The combination of the duplex valve C, constructed substantially as described, with the brake-cylinder B, two lines of pipes, and compound cocks therein.

5. The combination of a movable or flexible diaphragm with two hollow piston-valves and two lines of pipe, substantially as described.

To the above specification of my invention I have signed my name this 20th day of October, 1875.

H. LANSING PERRINE.

Witnesses:
  A. C. BRADLEY,
  WM. H. FINCKEL.